(12) United States Patent
Torrecilla Contreras

(10) Patent No.: US 11,231,011 B2
(45) Date of Patent: Jan. 25, 2022

(54) SYSTEM OF ROTOR, TRANSMISSION AND COLLECTION ELEMENTS THAT OPTIMISES A VERTICAL AXIS WIND TURBINE

(71) Applicant: José Antonio Torrecilla Contreras, Covalde (ES)

(72) Inventor: José Antonio Torrecilla Contreras, Covalde (ES)

( * ) Notice: Subject to any disclaimer, the term of this patent is extended or adjusted under 35 U.S.C. 154(b) by 70 days.

(21) Appl. No.: 16/626,637

(22) PCT Filed: Jul. 3, 2018

(86) PCT No.: PCT/ES2018/000058
§ 371 (c)(1),
(2) Date: Dec. 26, 2019

(87) PCT Pub. No.: WO2019/016417
PCT Pub. Date: Jan. 24, 2019

(65) Prior Publication Data
US 2020/0158079 A1    May 21, 2020

(30) Foreign Application Priority Data
Jul. 17, 2017   (ES) .......................... ES201700537U

(51) Int. Cl.
*F03D 15/00*   (2016.01)
*F03D 3/06*    (2006.01)
(Continued)

(52) U.S. Cl.
CPC .............. *F03D 3/005* (2013.01); *F03D 3/06* (2013.01); *F03D 7/06* (2013.01); *F03D 15/00* (2016.05)

(58) Field of Classification Search
None
See application file for complete search history.

(56) References Cited

U.S. PATENT DOCUMENTS 7,922,452 B2 *   4/2011   Dulcetti Filho ........ F03D 3/064
                                                      416/117
8,742,610 B2 *   6/2014   Brown .................. F03D 7/0296
                                                      290/44

(Continued)

FOREIGN PATENT DOCUMENTS

ES    2624727 A1    7/2017
GB    2425153 A     10/2006

OTHER PUBLICATIONS

ISA/ES, International Search Report (English) and PCT Written Opinion (Spanish) dated Oct. 15, 2018 issued in PCT International Application No. PCT/ES2018/000058.

*Primary Examiner* — Michael Lebentritt
*Assistant Examiner* — Jason G Davis
(74) *Attorney, Agent, or Firm* — John Alumit

(57) ABSTRACT

The invention is made up of a supporting tower on which a rotor is installed, which comprises two parallel crossarms having two parallel rings fastened to the outer ends thereof which serve as a support for the bearings which, secured to the outer casing, make up the rotor, and said casing fixed on the inside thereof comprises a toothed wheel for transmitting the force of rotation, by epicyclic gearing, to the interior of the tower which forms a space suitable for housing the transmission, which is necessarily vertical, and runs towards the multiplier box. The blades are formed on two horizontal parallel beams which are joined and compacted together by metal boxes which house the guiding mechanisms and shafts that support and orient the blades.

9 Claims, 6 Drawing Sheets

(51) Int. Cl.
  *F03D 7/06* (2006.01)
  *F03D 3/00* (2006.01)

(56) References Cited

U.S. PATENT DOCUMENTS

| | | | |
|---|---|---|---|
| 2005/0263057 A1* | 12/2005 | Green | F03D 3/068 |
| | | | 114/102.1 |
| 2009/0015015 A1* | 1/2009 | Joutsiniemi | F03D 13/20 |
| | | | 290/54 |
| 2009/0220342 A1* | 9/2009 | Wu | F03D 1/02 |
| | | | 416/124 |
| 2011/0062717 A1 | 3/2011 | Price, Jr. | |
| 2011/0181047 A1* | 7/2011 | Dulcetti Filho | F03D 3/062 |
| | | | 290/55 |
| 2016/0268810 A1 | 9/2016 | Grogan | |

* cited by examiner

SYSTEM OF ROTOR, TRANSMISSION AND COLLECTION ELEMENTS THAT OPTIMISES A VERTICAL AXIS WIND TURBINE

CROSS-REFERENCE TO RELATED APPLICATIONS

This application is the United States National Stage entry under 35 U.S.C. 371 of PCT/ES2018/000058, filed Jul. 3, 2018, which in turn claims the priority of Spanish Patent Application No. U 201700537, filed Jul. 17, 2017, the contents of each of which are hereby incorporated by reference in their entirety.

OBJECT OF THE INVENTION

The present invention relates to a system of rotor, transmission and collection elements that optimises a vertical axis generator, and which has been specially designed to meet the need for clean, efficient and environmentally friendly energy, also considering the impact on the landscape.

The development of several models of vertical axis wind turbines has been attempted taking advantage of new technologies that allow solving the typical complexities of this type of wind turbine.

Known vertical axis generators in their different versions are formed by a main tower anchored to the base and provided with corresponding rotors that transmit the movement generated to a vertical axis and the latter to an alternator with insertion of a multiplier box.

This type of generator has several drawbacks, one of the main ones being the manufacturing thereof since very high diameters are required to be able to generate a tower that can support a high blade surface since otherwise, the production is very low.

Another problem presented by this type of wind turbine is the complex slat guiding system, the power supply thereon and the braking system.

The advantages of this invention are the following:
The rotor, transmission and slat guidance described below offers a more versatile wind turbine model with varied applications in the medium power section.
Its installation and implementation can be performed both in electric transport towers, urban generators, telephone repeaters, etc.
The slat release proposed by the invention improves the braking system.
It is a system having great mechanical simplicity, easy assembly and with a very low cost in transportation.

The industrial application of this invention falls within the manufacture of vertical axis wind turbines, and more specifically, systems for optimising windcatching and maximising performance for vertical axis wind turbines.

BACKGROUND OF THE INVENTION

Although no identical invention to that described has been found, the documents found that reflect the state of the art related therewith are explained below.

Patent P21000171 and utility models 1070905 U and 1070534 U are known and none achieves to correctly solve this problem since they still use tubular structures that prevent the correct positioning of the rotors with the radius they require.

Although in the case of P21000171, increased performance is achieved, this is still limited as the blades cannot be lengthened and it can only grow in height. A wind turbine with greater performance is now required so the blades need to be lengthened thus increasing the diameter of the support structure while changing the entire configuration of the rotor, the transmission system and blade design.

Conclusions: As can be concluded from the research carried out, none of the documents found solves the problems posed as does the proposed invention.

DESCRIPTION OF THE INVENTION

The system of rotor, transmission and collection elements that optimises a vertical axis wind turbine object of the present invention is formed by a support tower in which this new rotor model is implemented with the components it requires.

The structure of this rotor varies depending on the intended application. Thus, if installed in an electric transport tower, it will be placed in the highest part under the conductor cables and keeping the required safety distances. Otherwise, if it is an urban generator or telephone repeater, it is installed in tubular or more aesthetic structures.

The rotor is created using electric transport towers as a support axis. For that purpose, two parallel crossarms are installed thereon, fastening at their outer ends two parallel rings that serve as a support for the bearings which, fastened to the outer casing, make up the rotor. This fixed casing in its inner part comprises a cogwheel that by means of epicyclic gearing will be responsible for transmitting the force of rotation to the centre of the tower, which forms an ideal space to house the transmission that will necessarily be vertical and will run to the multiplier box.

This rotor moves circularly on "bogies" (wheels) on which the beams that support the blades themselves rest, thus eliminating conventional bearings, simplifying assembly. These "bogies" are supported on the parallel rings described above, at different (upper and side) angles so as to prevent the rotor from being dislodged from the slide rail. These bogies are bearings with a specific configuration since the part forming them accommodates several bearings positioned at different angles thus allowing both a radial and axial support to the rotor.

It will be possible to establish the generator and accessories on the ground or at height according to needs, location and orography.

The braking system is double. With the slat release, leaving them free to the wind, the pressure is eliminated and by forward-backward motion compensation, the rotation force is cancelled and a brake integral to the transmission axis will allow braking and completely stopping the rotation of the machine.

The transmission of force is received from the cogwheel integral to the rotor that transfers that force to the epicyclic gearing and the latter to the main axis. In the case of locating the generator set on the ground, it will be composed of several sections connected to each other with swivel heads that correct the typical oscillations of these towers and each section will be self-supported with the corresponding coaxial and radial bearings.

The blades are materialised on two horizontally parallel beams joined and compacted together by metal boxes inside which the axes and guiding mechanisms are housed, providing support and orientation to the slats. These blades are in a single piece, the rotor axis being the midpoint with which its own weight is balanced without the need for anchors. The slats are guided and positioned from their reader mechanism associated with the copying disc and are connected to each other by a toothed strip or axis that forces the sprockets integral to the vertical axis of the slat. This sprocket is located inside the metal boxes and will rotate the slat in the desired direction.

The electricity generated by the machine is emptied through conventional power lines since the main use of the present invention is to implement this wind turbine in the electric transport network itself.

BRIEF DESCRIPTION OF THE DRAWINGS

For a better understanding of the present description, drawings representing a preferred embodiment of the present invention are attached.

Figure 1:
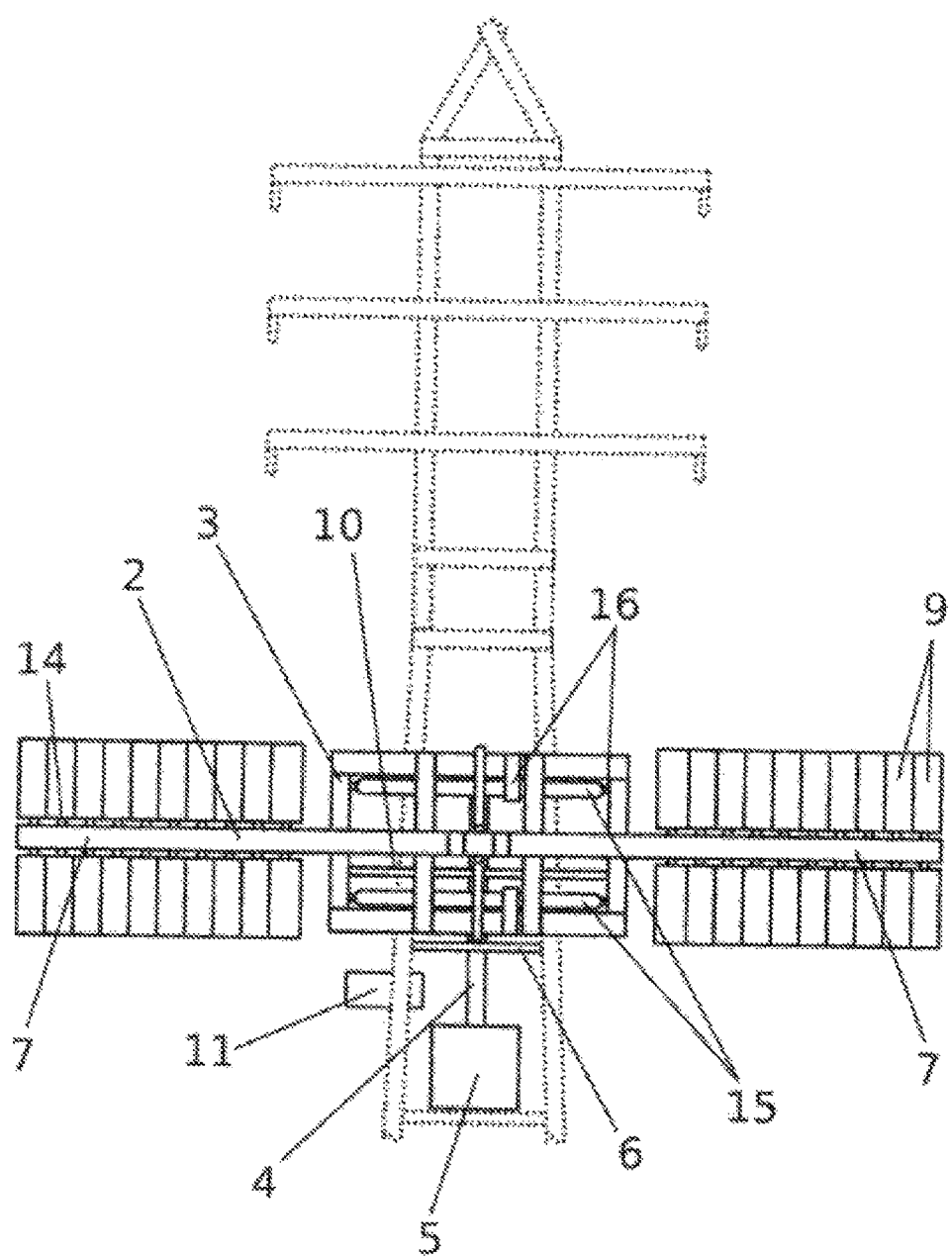
FIG. 1: Elevation view of an electric transport tower with the system object of the present invention installed under the conductor support arms.
Figure 2:
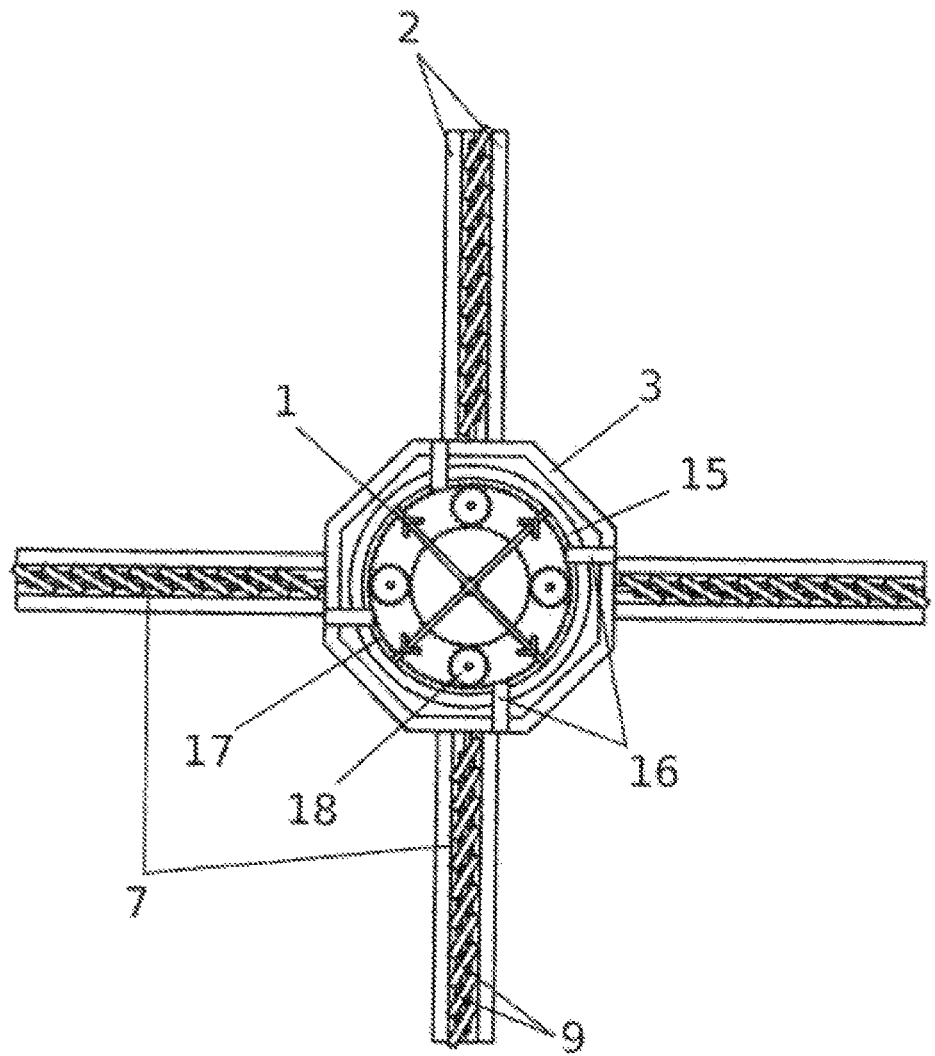
FIG. 2: Plan section of the electric transport tower with the system object of the present invention installed under the conductor support arms.
Figure 3:
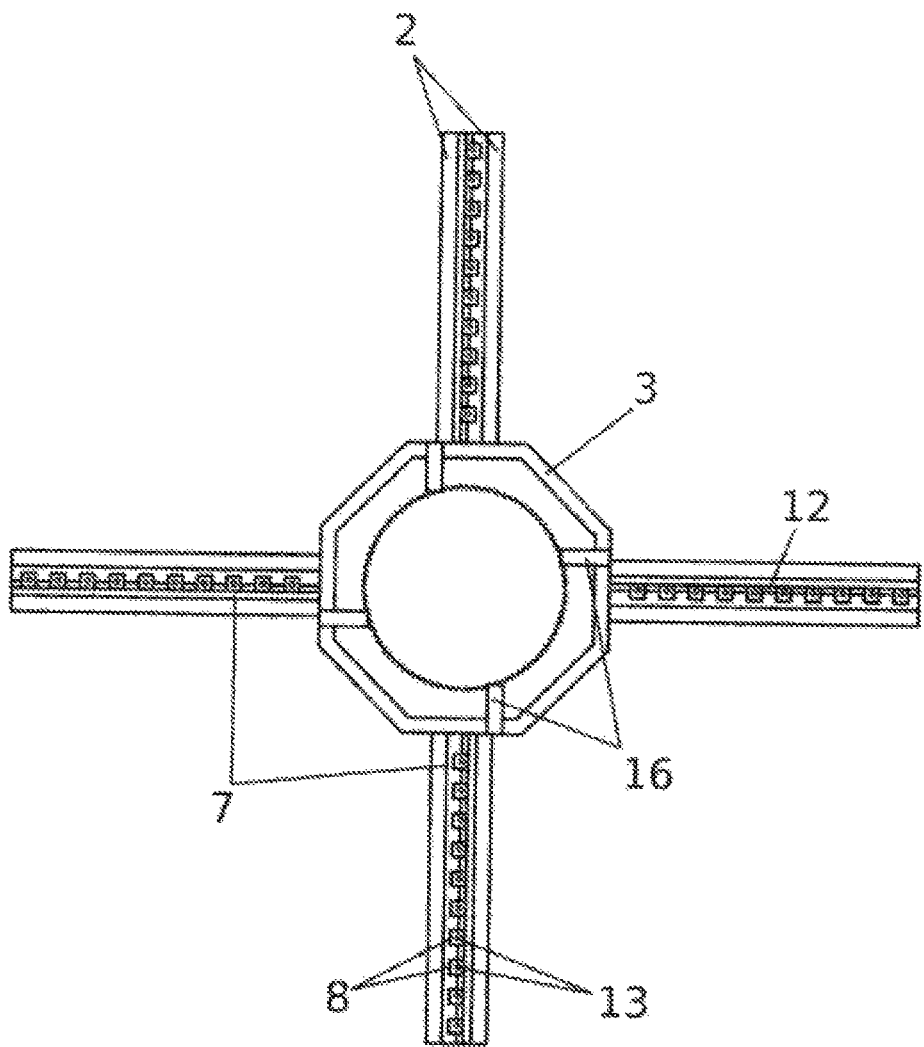
FIG. 3: Plan view of the rotor with the beams of the blades without slats.
Figure 4:
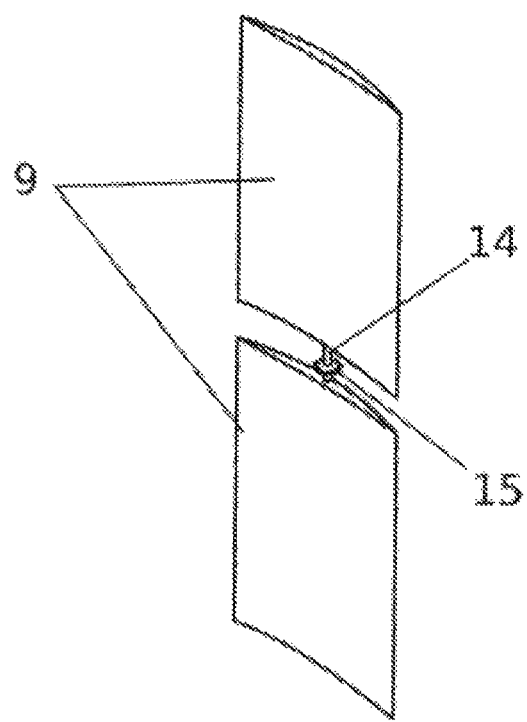
FIG. 4: Conventional perspective view of the slat with its axis and sprocket integral thereto.
Figure 5:
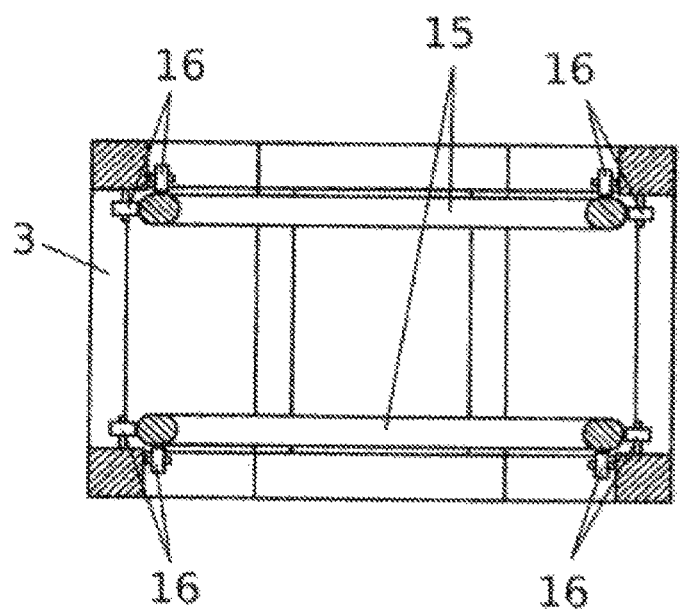
FIG. 5: Section elevation detail of the rotor fastening system to the pair of rails by bogies.
Figure 6:
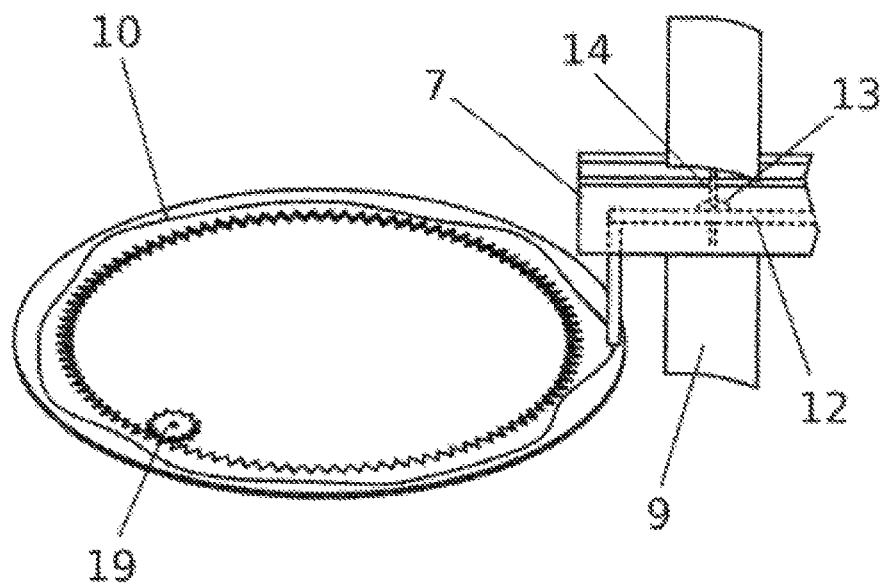
FIG. 6: Conventional perspective detail of the copying disc.

The numerical references that appear in said figures correspond to the following constituent elements of the invention:

1. Crossarm structure
2. Beams
3. Rotor
4. Main axis
5. Multiplier box and alternator
6. Brake disc
7. Blades
8. Metal boxes
9. Slats
10. Toothed disc comprising a line pattern
11. Vane
12. Toothed strip
13. Sprocket integral to the slat axis
14. Axis or mast of the slat
15. Double rail
16. Bogies
17. Rotor cogwheel
18. Epicyclic gearing
19. Orientation sprocket

DESCRIPTION OF A PREFERRED EMBODIMENT

A preferred embodiment of the system of rotor, transmission and collection elements that optimises a vertical axis wind turbine object of the present invention, with reference to the numerical references, can be based on a structure of crossarms (1) and beams (2) of structural steel or wood, coupled to an electric transport tower, leaving the rotor (3) with its blades (7) at the convenient distance below the conductor support arms, where, at its centre, the main vertical transmission axis (4) is housed and which will be associated with the multiplier box and its alternator (5). Said main axis (4) also integrally incorporates a brake disc (6) that will allow stopping the machine completely.

The blades (7) are housed at the crown of the rotor (3), and are constituted by four sets of horizontally parallel beams (2), which run from the outer ring of the rotor (3), upon which metal boxes (8), or angle gears, are disposed closely together. Inside of said metal boxes the slat (9) guiding mechanisms are housed and support the slats (9) which run from the anchoring mechanism upwards and downwards leaving this support structure in the middle and rotate on it.

The slats (9) are guided and positioned by an orientation sprocket (19) of an electronic mechanism associated to a vane (11), said orientation sprocket forces (19) movement of a toothed disc comprising a line pattern (10), which in turn forces movement of a toothed strip (12) based on said line pattern, resulting in movement of the sprockets (13) integral to the vertical axis of the slats (or angle gears). This sprocket (13) is inside the metal boxes (8) and will rotate the slat (9) in the desired direction.

At the height at which the rotor (3) is set, a platform (1) is elevated, with its anchors and stiffeners, on which a double rail (15) lies, which will serve to move "bogies" (16) or bearings of the rotor (3), which are positioned at different (upper and side) angles so as to prevent the rotor (3) from being dislodged from the double slide rail (15). These bogies (16) are bearings with a specific configuration that allows both radial and axial support to the rotor (3).

The transmission of force is received from the cogwheel (17) integral to the rotor (3) that transfers that force to an epicyclic gearing (18) and the latter to the main axis (4). The electricity generated by the machine is emptied through conventional power lines.

In a different embodiment the system is installed on a repeater post or other type of tower.

The invention claimed is:

1. A system that optimises a vertical axis wind turbine, comprising:
a structure of crossarms and beams that are composed of one of structural steel and wood, coupled to an electric transport tower, wherein a rotor with a series of blades is disposed at a distance below a conductor support arms of the electric transport tower; and
a main vertical axis of transmission is disposed at a center of the rotor, the main vertical axis of transmission being connected to a multiplier box and an alternator;
wherein said series of blades is equipped with slats and slat guiding mechanisms to regulate the blades' resistance to a passage of air; said slat guiding mechanisms comprised of one of a mast and an axis of the slat, and a sprocket integral thereto.

2. The system of claim 1, wherein the main vertical axis integrally incorporates a brake disc that is configured to allow the machine to brake completely.

3. The system of claim 1, wherein, when the multiplier box and the alternator are housed on the ground, the main vertical axis is divided into sections linked by swivel heads.

4. The system of claim 1, wherein the beams are four sets of horizontally parallel beams that constitute the series of blades, which run from an outer ring of the rotor, and upon which metal boxes are disposed closely together, said metal boxes housing the slat guiding mechanisms, which support and anchor the slats said slats disposed above and below the metal boxes.

5. The system of claim 4, wherein the slats comprise two rectangular shapes supported by the mast or the axis of the slat in a center that penetrates the metal boxes that join the beams and inside link with the mast of the slat of the lower part of the beams with one of a cogwheel and a sprocket.

6. The system of claim 4, wherein the metal boxes that horizontally assemble the beams, house the sprockets integral to the slat axis or mast that support the slats and orient their movement in a desired direction.

7. The system of claim 1, wherein the slats are guided and positioned by an orientation sprocket of an electronic mechanism associated to a vane, said orientation sprocket forces movement of a toothed disc comprising a line pattern, which in turn forces movement of a toothed strip based on said line pattern, resulting in movement of the sprockets integral to the vertical axis of the slats.

8. The system of claim 1, wherein at a height at which the rotor is set, a platform is elevated, with anchors and stiffeners, on which a double rail lies, which will serve to move bearings of the rotor, which are positioned at different angles so as to prevent the rotor from being dislodged from the double rail.

9. The system of claim 1, wherein a transmission of force is received from a cogwheel integral to the rotor that transfers that force to an epicyclic gearing and the epicyclic gearing to the main vertical axis.

* * * * *